(12) United States Patent
Satou et al.

(10) Patent No.: US 8,852,477 B2
(45) Date of Patent: Oct. 7, 2014

(54) CABLE-SEALING MEMBER AND ITS PRODUCING METHOD

(75) Inventors: Nobushige Satou, Tokyo (JP); Kazuhiko Tsuji, Tokyo (JP)

(73) Assignee: Fujikura Rubber Ltd., Tokyo (JP)

( * ) Notice: Subject to any disclaimer, the term of this patent is extended or adjusted under 35 U.S.C. 154(b) by 0 days.

(21) Appl. No.: 14/115,704

(22) PCT Filed: Apr. 25, 2012

(86) PCT No.: PCT/JP2012/061627
§ 371 (c)(1),
(2), (4) Date: Nov. 5, 2013

(87) PCT Pub. No.: WO2012/160954
PCT Pub. Date: Nov. 29, 2012

(65) Prior Publication Data
US 2014/0077409 A1    Mar. 20, 2014

(30) Foreign Application Priority Data

May 20, 2011 (JP) .................................. 2011-113179

(51) Int. Cl.
*B26D 3/00* (2006.01)
*B29D 99/00* (2010.01)
*H02G 15/113* (2006.01)
*H02G 3/22* (2006.01)
*G02B 6/44* (2006.01)

(52) U.S. Cl.
CPC .......... *B29D 99/0053* (2013.01); *H02G 15/113* (2013.01); *G02B 6/4444* (2013.01); *G02B 6/4471* (2013.01); *H02G 3/22* (2013.01)

USPC ................. 264/154; 83/875; 83/13; 82/1.11; 82/123

(58) Field of Classification Search
None
See application file for complete search history.

(56) References Cited

U.S. PATENT DOCUMENTS

| 5,048,382 A | 9/1991 | Mitchell |
| 8,122,795 B2 * | 2/2012 | Goll ............................. 82/1.11 |
| 2009/0158911 A1 * | 6/2009 | Goll ............................. 83/880 |

FOREIGN PATENT DOCUMENTS

JP    A-2001-253983    9/2001

OTHER PUBLICATIONS

Nov. 28, 2013 International Preliminary Report on Patentability issued in International Application No. PCT/JP2012/061627.
International Search Report issued in International Patent Application No. PCT/JP2012/061627 dated Jul. 31, 2012.

* cited by examiner

*Primary Examiner* — Benjamin Schiffman
(74) *Attorney, Agent, or Firm* — Oliff PLC

(57) ABSTRACT

A method for producing a cable-sealing member is disclosed. The method comprises forming a formed rubber including a first plane and a second plane that oppose in a thickness direction and a side plane that bridges a peripheral edge of the first plane and a peripheral edge of the second plane. The method further includes rotating the formed rubber with one axis in the thickness direction as a rotary axis while a holder is applied over the side plane of the formed rubber and, meanwhile, inserting a cutting blade from the first plane into the formed rubber to form a ring-form slit portion and stopping the cutting blade just in front of the second plane, leaving a slit-form ring unbored on one side.

10 Claims, 11 Drawing Sheets thickness direction

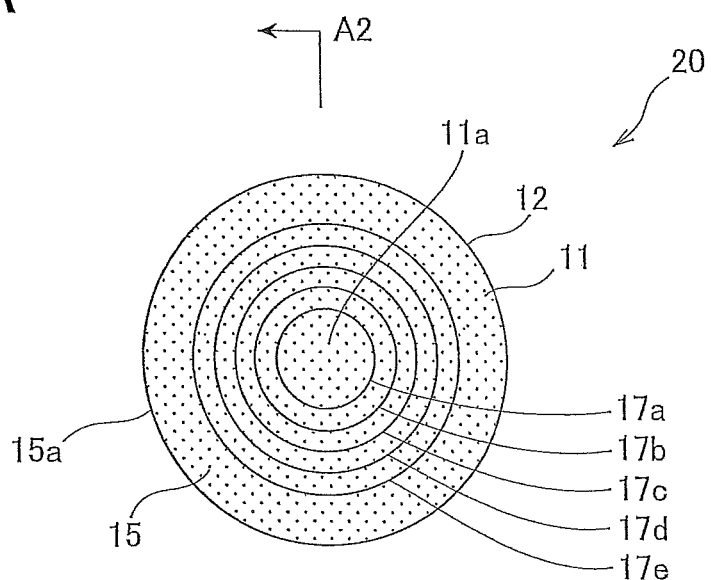
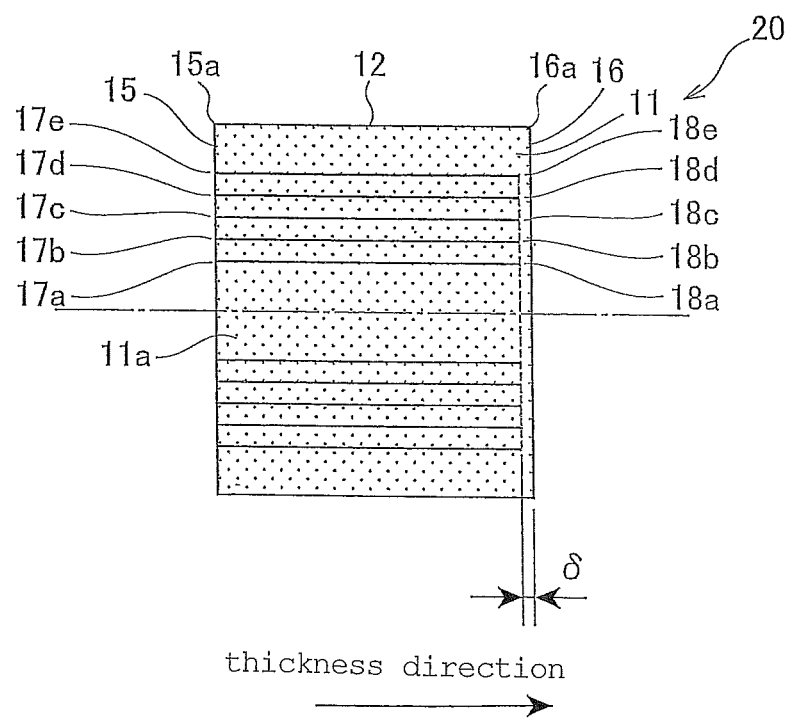

thickness direction

CABLE-SEALING MEMBER AND ITS PRODUCING METHOD

TECHNICAL FIELD

The present invention relates to a cable-sealing member located at an end of a cable protection case used for protection of connections, etc. of optical fiber cables for optical communications for the purpose of preventing liquids from entering from outside in the cable protection case, and a method for producing the same.

BACKGROUND ART

For the purpose of protecting the connections, etc. of optical fiber cables, a cable protection case for wrapping them for protection is generally used. For example, the cable protection case is built up of a combination of halves obtained by splitting an elongate cylindrical case longitudinally. After the connections, etc. of optical fiber cables are received in that combination, the cylindrical case is assembled with the splitting surfaces of the halves in a butt-to-butt relation. Thereafter, the splitting surfaces are firmly fixed against taking apart.

Both end faces of such a cable protection case are required to remain closed up with the cables inserted through it for the purpose of preventing entrance of liquids from outside.

So far, both ends faces of such a cable protection case have generally been closed up by the following method.

There are end face-sealing members at the ready that are attachable to the end faces to provide sealing of both end faces of the cable protection case. The end face-sealing member is available in two types: one type having a cable insertion inlet opening larger than the outer diameter of an actually inserted cable, wherein a packing or bushing working as a spacer or a rubber tape of certain thickness is wrapped around a gap between the cable insertion inlet and the cable thereby making sure sealing of the gap between the cable insertion inlet and the cable, and another type using a sealing tape for making sure air tightness or liquid tightness in addition to the above arrangement.

Besides, there is yet another type of the end face-sealing member having a tapered hole inside, in which case a given position of the tapered portion is cut on the ground in such a way as to be compatible with the outer diameter of the cable used.

In the above method using the packing or bushing as the spacer, however, there is typically the need for always having several spacers at the ready and storing them in hand in such a way as to be compatible with several cable outer diameters, resulting in a problem that a parts count gets too increased for satisfactory handling.

The wrapping method using the rubber tape or sealing tape to make sure sealing capability, on the other hand, is difficult to work with, and removal of these tapes puts too much burden on the addition and maintenance of cables in particular.

With the end face-sealing member having a tapered hole inside, it would be difficult to determine the position of cutting because which portion is to be cut to obtain a given inner diameter is invisible to the naked eye.

To solve these problems, Patent Publication 1 (U.S. Pat. No. 5,048,382), cited here as a pertinent prior art, shows a method for producing a rubber elastic sealing device having a plurality of concentric rings. The rubber elastic sealing device produced by such a method includes a plurality of removable concentric ring-form slit portions, and an associated removable ring-form slit portion is optionally taken out of the site of the desired ring diameter depending on the outer diameter of the cable inserted, thereby having the desired hole diameter size.

In the method, as set forth in Patent Publication 1, of producing a rubber elastic sealing device having a plurality of concentric rings, however, the rubber to be processed has a durometer A hardness of 35 to 75. Such rubber hardness is too high to ensure sufficient sealing capability as an end face-sealing member for cables.

When the rubber hardness is lower than described above in terms of durometer A hardness of less than 30 as an example, a problem with the method set forth in Patent Publication 1 is to be unable to provide stable formation of removable concentric rings.

LISTING OF THE PRIOR ART

Patent Documents

Patent Document 1: U.S. Pat. No. 5,048,382

SUMMARY OF INVENTION

Problems to be Resolved by the Invention

Having been made with such situations in mind, the present invention has for its object to provide a cable-sealing member that is formed of a rubber material having good enough sealing capability and includes a removable ring-form slit portion (s) and a method for producing the same.

Means of Solving the Problems

To solve such problems, the present invention provides a cable-sealing member that is located at an end of a cable protection case for preventing liquids from entering from outside into the cable protection case, wherein said cable-sealing member is made up of a formed rubber having a durometer A hardness of greater than 0 up to 30, said formed rubber includes a first plane and a second plane that oppose in the thickness direction and a side plane that bridges a peripheral edge of the first plane and a peripheral edge of the second plane, said formed rubber includes at least one ring-form slit portion formed in the thickness direction, and said ring-form slit portion starts from said first plane, extends in the thickness direction, and terminates just in front of the second plane, leaving an unbored portion.

The present invention provides a method for producing the above cable-sealing member by forming a formed rubber including a first plane and a second plane that oppose in a thickness direction and a side plane that bridges a peripheral edge of the first plane and a peripheral edge of the second plane and having a durometer A hardness of greater than 0 up to 30, and rotating the formed rubber with one axis in the thickness direction as a rotary axis while a holder is applied over the side plane of the formed rubber and, meanwhile, inserting a cutting blade from the first plane into the formed rubber to form a ring-form slit portion and stopping the cutting blade just in front of the second plane, leaving a slit-form ring unbored on one side.

In a preferable embodiment of the inventive method for producing a cable-sealing member, said formed rubber is in a substantially cylindrical configuration, and has a through-hole formed through a center axis in a thickness direction thereof, there is a processing holder provided, comprising a shaft portion capable of being inserted into said through-hole, a round flange portion positioned at a base of the shaft portion and including a placement plane vertical to the shaft portion, and a holder shaft that extends from said round flange portion in a direction opposite to the shaft portion, and the through-hole in the formed rubber is inserted over the shaft portion of said processing holder, the second plane of the formed rubber is set in place while it is in abutment against the placement plane of the round flange portion, the holder shaft of said processing holder is fixedly coupled to a rotary machine while a cylindrical holder is applied over the side plane of the formed rubber, and the formed rubber is rotated with the shaft portion as a rotary axis, leaving a ring-form slit portion unbored on one side.

In a preferable embodiment of the inventive method for producing a cable-sealing member, there are a plurality of said ring-form slit portions formed concentrically, said plurality of said ring-form slit portions being concentrically formed by varying a position of inserting the cutting blade from said first plane into the formed rubber in order in a radial direction.

In a preferable embodiment of the inventive method for producing a cable-sealing member, said cylindrical holder is formed of a resin, and provided at a part of a circumference with a splitting slit for cutting a closed loop.

In a preferable embodiment of the inventive method for producing a cable-sealing member, said formed rubber is a substantially columnar configuration having no through-hole through a center axis in a thickness direction thereof, and the cylindrical holder is applied over the side plane of the formed rubber, an outer holder is further applied over said cylindrical holder, an outer periphery of said outer holder is fixedly coupled to and between chucks of a rotary machine, and the formed rubber is rotated to form a ring-form slit portion unbored on one side.

In a preferable embodiment of the inventive method for producing a cable-sealing member, said cylindrical holder is divided into a plurality of segments, said plurality of segments are assembled into the original cylindrical configuration for application over the side plane of the formed rubber, and said outer holder is made up of a metallic holder that is provided at a part of a circumference with a splitting slit for cutting a closed loop.

In a preferable embodiment of the inventive method for producing a cable-sealing member, there are a plurality of said ring-form slit portions formed concentrically, said plurality of said ring-form slit portions being concentrically formed by varying a position of inserting a cutting blade from said first plane into the formed rubber in order in a radial direction.

In a preferable embodiment of the inventive method for producing a cable-sealing member, said cylindrical holder divided into a plurality of segments is formed of a resin.

In a preferable embodiment of the inventive method for producing a cable-sealing member, while the holder is applied over the side plane of the formed rubber, the formed rubber is rotated with one axis in the thickness direction as a rotary axis and, meanwhile, the cutting blade is inserted from the first plane into the formed rubber to form a ring-form slit portion and stopped just in front of the second plane to form a ring-form slit portion unbored on one side, and then, while the holder is applied over the side plane of the formed rubber, the formed rubber is rotated with another axis in the thickness direction as a rotary axis and, meanwhile, the cutting blade is inserted from the first plane into the formed rubber to form a ring-form slit portion and stopped just in front of the second plane, leaving a ring-form slit portion unbored on one side, so that a plurality of ring-form slit portions are dispersedly located in different places on the first plane.

In a preferable embodiment of the inventive method for producing a cable-sealing member, there are a plurality of said ring-form slit portions formed concentrically with one axis in the thickness direction as a rotary axis, and there are a plurality of said ring-form slit portions formed concentrically with another axis in the thickness direction as a rotary axis.

Advantageous Effect of Invention

The present invention provides a cable-sealing member that is located at an end of a cable protection case for the purpose of preventing liquids from entering into the cable protection case from outside, said cable-sealing member being made up of a formed rubber having a durometer A hardness of greater than 0 up to 30, wherein said formed rubber includes a first plane and a second plane that oppose in the thickness direction and a side plane that bridges a peripheral edge of the first plane and a peripheral edge of the second plane, said formed rubber includes at least one ring-form slit portion formed in the thickness direction, and said ring-form slit portion starts from said first plane, extends in the thickness direction, and terminates just in front of the second plane, leaving an unbored portion.

Therefore, the cable-sealing member has good enough sealing capability and includes a removable ring-form slit portion(s), resulting in a reduced parts count. There is also no need of always carrying around a variety of parts, contributing more to improvements in workability.

The present invention also provides a method for producing such a cable-sealing member by forming a rubber including a first plane and a second plane that oppose in the thickness direction and a side plane that bridges a peripheral edge of the first plane and a peripheral edge of the second plane and having a durometer A hardness of greater than 0 up to 30, and rotating the formed rubber with one axis in the thickness direction as a rotary axis while a holder is applied over the side plane of the formed rubber and, in the meantime, inserting a cutting blade from the first plane into the formed rubber to form a ring-form slit portion and stopping the cutting blade just in front of the second plane, leaving a slit-form ring unbored on one side. Therefore, ring-form slit portions that have not been able to be stably processed of rubbers having low durometer A hardness of less than 30 can be stably processed, advantageously providing a novel cable-sealing member that is excellent in sealing capability and includes a removable ring-form slit portion(s).

BRIEF EXPLANATION OF THE DRAWINGS

FIG. 2A is a front view of one preferable embodiment of the cable-sealing member according to the present invention, and FIG. 2B is a sectional view as taken on A2-A2 of FIG. 2A.

EMBODIMENTS FOR CARRYING OUT THE INVENTION

Preferable embodiments for carrying out the present invention will now be explained in details.

Figure 11:
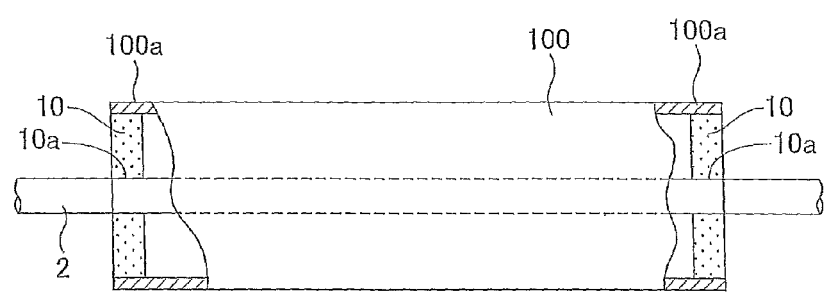
FIG. 11 is a partly sectioned schematic view of one simple example of the cable-sealing member being attached to both end faces of a cable protection case in which an optical fiber cable or the like is encased for protection.

As shown schematically in FIG. 11 as an example, the inventive cable-sealing member 10 is located at either end 100a of a cable protection case 100 for the purpose of preventing a liquid from entering in the cable protection case 100 from outside (keeping light tightness).

For instance, the cable protection case 100 is made up of a combination of two halves obtained by splitting an elongate cylindrical case longitudinally. Referring to a preferable form of that case, a connection or the like of optical fiber cables or other cables is received between the two halves. Then, the two halves are assembled into the cylindrical case with the splitting faces in a butt-to-butt relation. Thereafter, they are firmly fixed using a fixing means (not shown) in such a way as to prevent the splitting faces from taking apart. In practical applications, however, there are various types; the case 100 is not always limited to such a form.

For instance, the cable-sealing member 10 according to the present invention may include a through-hole 10a in which a cable 2 is inserted as illustrated, and a junction between the through-hole 10a and the cable 2 and a junction between the cable protection case 100 and the cable-sealing member 10 must have a function of preventing entrance of a liquid.

Occasionally, the cable-sealing member 10 may be used as a closure plug having none of the through-hole 10a: it does not always have the through-hole 10a formed for insertion of the cable 2. Especially if there are a plurality of formable through-holes 10a provided, some may be used as the through-hole 10a for insertion of the cable 2, and some may be used as the closure plug for just closing up holes.

[Explanation of the First Embodiment of the Cable-Sealing Member]

Figure 1A:
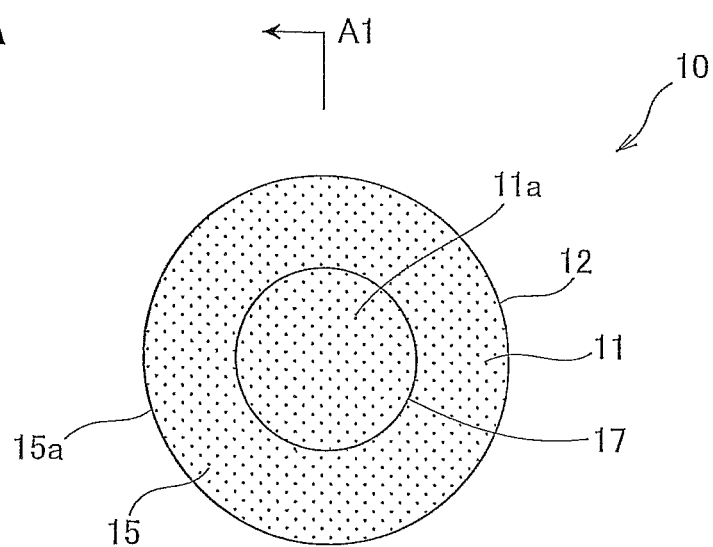
FIG. 1A is a front view of one preferable embodiment of the cable-sealing member according to the present invention.
Figure 1B:
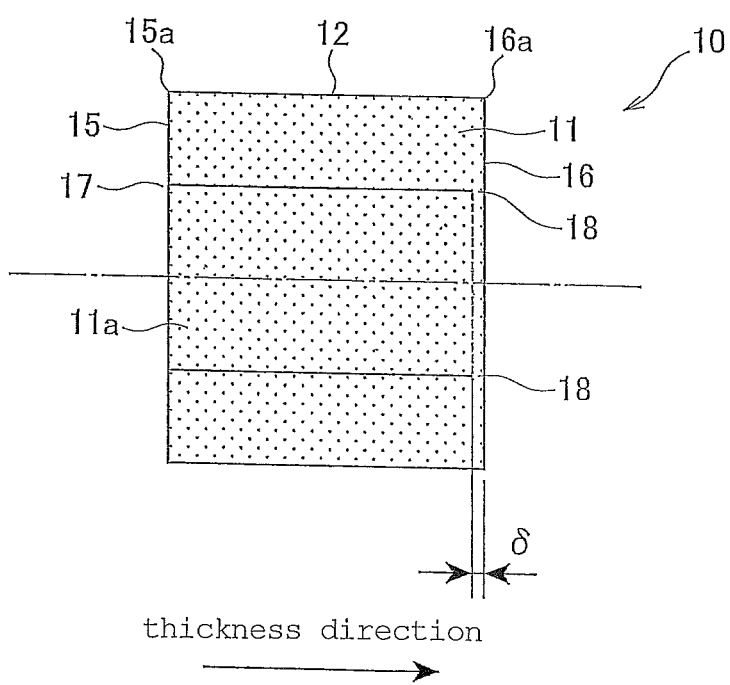
FIG. 1B is a sectional view as taken on A1-A1 of FIG. 1A.

First of all, the first embodiment of the cable-sealing member according to the present invention is explained with reference to FIGS. 1A and 1B. FIG. 1A is a front view of one preferable embodiment of the cable-sealing member according to the present invention, and FIG. 1B is a sectional view as taken on A1-A1 of FIG. 1A.

The cable-sealing member 10 according to the present invention is made up of a formed rubber 11 having a physical property as represented by a durometer A hardness of greater than 0 up to 30, preferably 2 to 20, and more preferably 2 to 15.

The durometer A (Duro-A) hardness may be determined pursuant to JIS K6253. In the present invention, a durometer A hardness exceeding 30 will cause the interface between the cable-sealing member 10 and other member to be less than satisfactory in terms of sealing capability, resulting in difficulty keeping liquid tightness.

Specific rubber materials, for instance, include ethylene-propylene-diene copolymer rubber (EPDM), nitrile-butadiene rubber (NBR), silicone rubber, fluororubber and butadiene rubber or any suitable mixtures of them. After additives such as vulcanizing agents, vulcanizing accelerators and oils are added to such a rubber material, they are kneaded by a kneading machine, and the obtained rubber mixture is molded and vulcanized into a predetermined shape. In this manner the desired formed rubber may be obtained.

For instance, if a suitable amount of an oil well compatible with rubber is contained in the rubber material, it is then possible to adjust the rubber hardness. Alternatively, the rubber hardness may be adjusted by a choice of rubber materials having a lower molecular weight too.

For instance, the vulcanizing agent here includes sulfur, peroxides, quinoids, alkyl phernol formaldehyde resin, and alkyl phenol sulfide resins, which may be opted depending on the rubber material used. The vulcanizing agent includes those based on thiourea, guanidine, thiazole, sulfenamide, thiuram, dithiocarbamate and so on. If necessary, the above rubber material may also contain antioxidants, organic fatty acids such as stearic acid, white fillers (such as silica, calcium carbonate, talc, and clay), fillers such as carbon black, and so on. As will be described later, it is preferable to reduce the content of carbon black and use the white filler in a more increased amount enough to compensate for the reduction thereby facilitating formation of ring-form slit portions carried out after the formation of the formed rubber.

As shown in FIG. 1B, the formed rubber 11 in the present invention includes a first plane 15 and a second plane 16 that oppose in the thickness direction, and a side plane 12 that bridges between a peripheral edge 15a of the first plane 15 and a peripheral edge 16a of the second plane 16. In the first embodiment in particular, the formed rubber 11 is in a substantially columnar configuration having no through-hole through the center axis in the thickness direction. The "substantially columnar configuration" is here understood to mean any configuration in which a part of the side plane of columnar shape is cut out in its thickness or circumferential direction. Therefore, polygons including a triangle are embraced too.

Such formed rubber 11 has at least one ring-form slit portion 17 formed in the thickness direction (only one such ring-form slit portion 17 is shown).

The ring-form slit portion 17 starts from the first plane 15, extends in the thickness direction, and terminates just in front of the second plane 16, leaving an unbored portion 18.

This unbored portion 18 may be forcibly torn off by a worker's hand, and this tearing job enables a central core rubber portion 11a to be removed, leaving a through-hole.

A distance δ from the deepest portion of the slit up to the second plane 16 shown in FIG. 1B is about 0.1 to 1.0 mm, and preferably 0.1 to 0.5 mm.

As the value of this distance δ exceeds the upper limit value of 1.0 mm, it will make it difficult to forcibly tear off the unbored portion 18, leaving the through-hole. As the value of the distance δ is below the lower limit value of 0.1 mm, on the other hand, the remaining thickness of the unbored portion 18 will be way too small, leading to inconvenience that during transportation or packaging, the unbored portion 18 breaks down partly or wholly, forming a part or the whole of the through-hole. It follows that the intended specifications that the unbored portion can be torn off depending on the worker's intension are unachievable. Otherwise, there is a possibility that the cable-sealing member may be unable to be used as a closure plug without any through-hole formed.

Such cable-sealing member 10 according to the first embodiment is made up of a formed rubber having an extremely low durometer A hardness of 30 or less, and has at least one ring-form slit portion 17 formed in the thickness direction so that it can be used with the through-hole formed through it or used just as a closure plug without any through-hole formed. It follows that the single cable-sealing member 10 may be used in two ways, making it possible to reduce a parts count. In addition, this cable-sealing member makes sure good enough sealing capability even when it is used with the through-hole formed through it, because of being made up of the formed rubber having an extremely low durometer A hardness of 30 or less.

It is to be noted that as far as Applicant's research is concerned, the inventive cable-sealing member 10 made up of a formed rubber having an extremely low durometer A hardness of 30 or less and having at least one ring-form slit portion 17 formed in the thickness direction is not on the market as yet.

[Explanation of the Second Embodiment of the Cable-Sealing Member]

The second embodiment of the cable-sealing member according to the present invention is then explained with reference to FIGS. 2A and 2B. FIG. 2A is a front view of one preferable embodiment of the cable-sealing member according to the present invention, and FIG. 2B is a sectional view as taken on A2-A2 of FIG. 2A. Note here that like references used in these drawings substantially mean such like members as already mentioned.

The cable-sealing member 20 according to the second embodiment is essentially different from that of the first embodiment in that there are a plurality of ring-form slit portions 17a, 17b, 17c, 17d and 17e concentrically formed.

More specifically, a formed rubber 11 has a plurality of concentric ring-form slit portions 17a, 17b, 17c, 17d and 17e formed in the thickness direction. Although five ring-form slit portions are exemplified, it is to be understood that there is no particular limitation on how many ring-form slit portions are provided. By way of example but not by way of limitation, the spacing between the adjacent, concentrically located rings is about 0.5 to 2.0 mm, and preferably about 0.7 to 1.2 mm.

Each of the ring-form slit portions 17a, 17b, 17c, 17d and 17e starts from the first plane 15, extends in the thickness direction, and terminates just in front of the second plane 16, leaving an unbored portion 18a, 18b, 18c, 18d, 18e. The distance 8 may be determined as mentioned above.

These unbored portions 18a, 18b, 18c, 18d and 18e may be forcibly torn off by a worker's hand, and which of the ring-form slit portions 17a, 17b, 17c, 17d and 17e is to be torn off may be optionally determined depending on the outer diameter of the cable used. This tearing job enables the given concentric slit portion including a core rubber 11a to be removed, leaving a through-hole. It goes without saying that if none of the ring-form slit portions is torn off while any through-hole is not formed, the cable-sealing member may be used just as a closure plug.

The durometer A hardness and rubber composition of the cable-sealing member 20 may be set as described above.

Because such cable-sealing member 20 according to the second embodiment is made up of a formed rubber having an extremely low durometer A hardness of 30 or less, and especially because it has a plurality of ring-form slit portions formed concentrically in the thickness direction, any suitable ring-form slit portion may be optionally picked up depending on the outer diameter of the cable used to form a through-hole of suitable size, resulting in a reduced parts count. In addition, good enough sealing capability is achievable. Furthermore, the cable-sealing member 20 may be used just as a closure plug having no through-hole formed, resulting in a further reduced parts count.

It is to be noted that as far as Applicant's research is concerned, the cable-sealing member 20 made up of a formed rubber having an extremely low durometer A hardness of 30 or less and having a plurality of ring-form slit portions formed concentrically in the thickness direction is not on the market as yet.

[Explanation of the Third Embodiment of the Cable-Sealing Member]

Figure 3A:
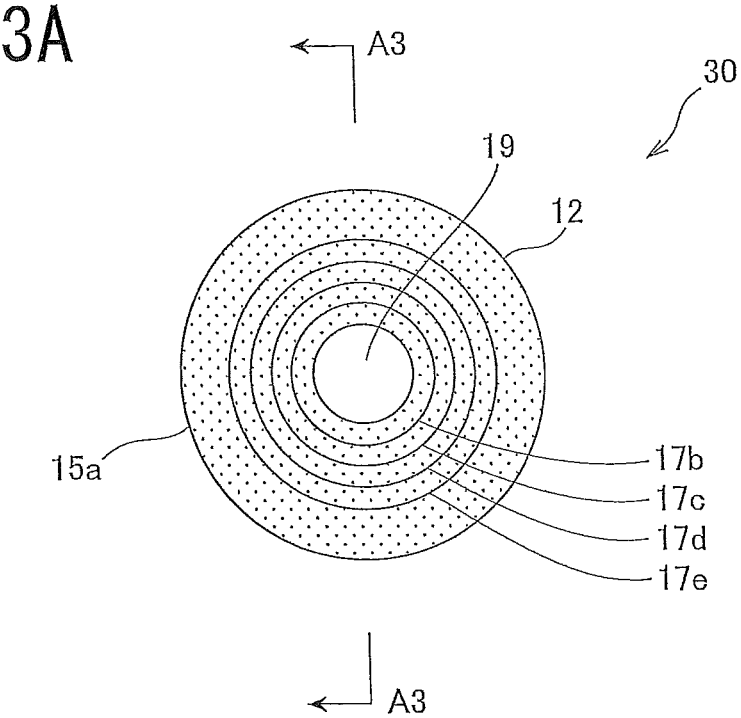
FIG. 3A is a front view of one preferable embodiment of the cable-sealing member according to the present invention.
Figure 3B:
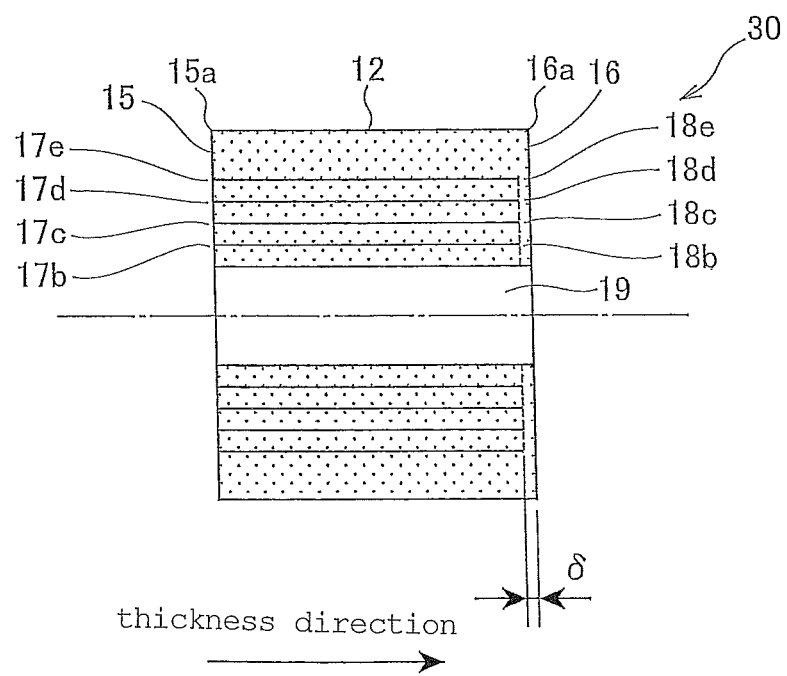
FIG. 3B is a sectional view as taken on A3-A3 of FIG. 3A.

The third embodiment of the cable-sealing member according to the present invention is now explained with reference to FIGS. 3A and 3B. FIG. 3A is a front view of one preferable embodiment of the cable-sealing member according to the present invention, and FIG. 3B is a sectional view as taken on A3-A3 of FIG. 3A. Note here that like references used in these drawings substantially mean such like members as already mentioned.

The cable-sealing member 30 according to the third embodiment shown in FIGS. 3A and 3B is essentially different from that of the second embodiment shown in FIGS. 2A and 2b in that there is a through-hole 19 formed through the center axis in the thickness direction. And a plurality of ring-form slit portions 17b, 17c, 17d and 17e are formed in a concentric relation to the circular shape of this through-hole 19. Although four ring-form slit portions are exemplified, it is to be understood that there is no particular limitation on how many ring-form slit portions are provided.

The spacing between the adjacent, concentrically located rings may be determined as described above.

Each of the ring-form slit portions 17b, 17c, 17d and 17e starts from the first plane 15, extends in the thickness direction, and terminates just in front of the second plane 16, leaving an unbored portion 18b, 18c, 18d, 18e. The distance δ may be determined as mentioned above.

These unbored portions 18b, 18c, 18d and 18e may be forcibly torn off by a worker's hand, and which of them is to be torn off may be optionally determined depending on the outer diameter of the cable used. This tearing job enables the given concentric slit to be removed, leaving a through-hole. In this case, however, the cable-sealing member itself may not be used as any closure plug.

The durometer A hardness and rubber composition of the cable-sealing member 30 may be determined as described above.

Because such cable-sealing member 30 according to the third embodiment is made up of a formed rubber having an extremely low durometer A hardness of 30 or less, and especially because it has a plurality of ring-form slit portions formed concentrically in the thickness direction, any suitable ring-form slit portion may be optionally picked up depending on the outer diameter of the cable used to form a through-hole of suitable size, resulting in a reduced parts count. In addition, good enough sealing capability is achievable.

It is to be noted that as far as Applicant's research is concerned, the cable-sealing member 30 made up of a formed rubber having an extremely low durometer A hardness of 30 or less and having a plurality of ring-form slit portions formed concentrically in the thickness direction is not on the market as yet.

[Explanation of the Fourth Embodiment of the Cable-Sealing Member]

Figure 4A:
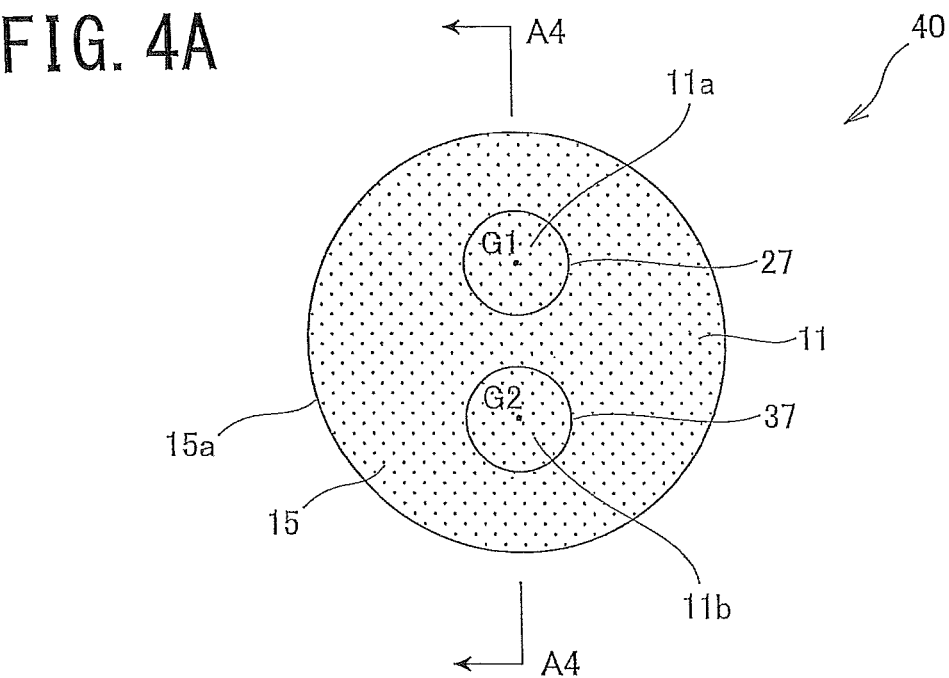
FIG. 4A is a front view of one preferable embodiment of the cable-sealing member according to the present invention.
Figure 4B:
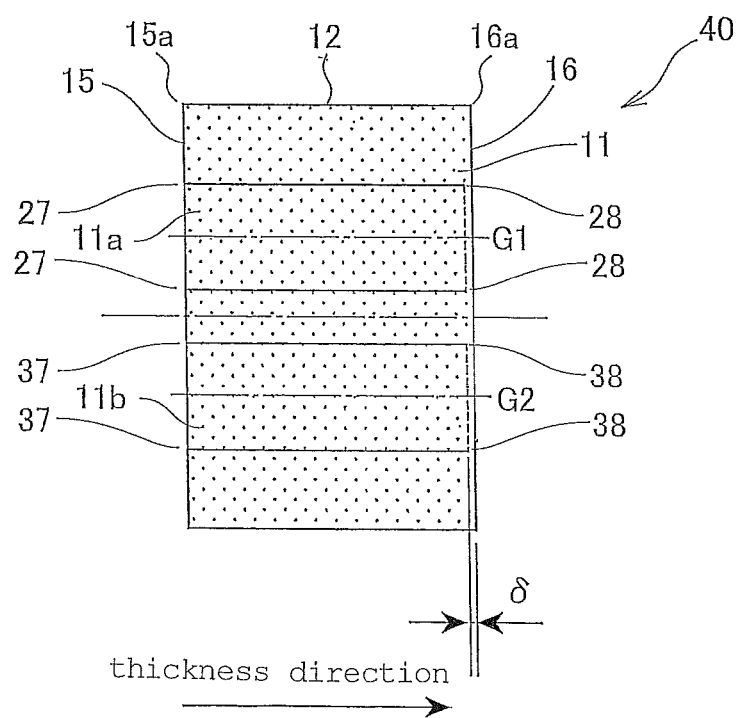
FIG. 4B is a sectional view as taken on A4-A4 of FIG. 4A.

The fourth embodiment of the cable-sealing member according to the present invention is now explained with reference to FIGS. 4A and 4B. FIG. 4A is a front view of one preferable embodiment of the cable-sealing member according to the present invention, and FIG. 4B is a sectional view as taken on A4-A4 of FIG. 4A. Note here that like references used in these drawings substantially mean such like members as already mentioned.

The cable-sealing member 40 according to the fourth embodiment shown in FIGS. 4A and 4B is essentially different from that of the first embodiment shown in FIGS. 1A and 1B in that a plurality of ring-form slit portions 27 and 37 (although two ring-form slit portions are exemplified, it is noted that there is no particular limitation on how many ring-form slit portions are provided) are dispersedly located in different places on the first plane 15. More specifically, one ring-form slit portion 27 is formed with one axis G1 in the thickness direction as a center axis, and another ring-form slit portion 37 is formed with another axis G2 in the thickness direction as a center axis. The spacing between G1 and G2 may be determined in such a range that the ring-form slit portion 27 does not intersect the ring-form slit portion 37.

Each of these ring-form slit portions 27 and 37 starts from the first plane 15, extends in the thickness direction, and terminates just in front of the second plane 16, leaving an unbored portion 28, 38. The distance δ may be determined as mentioned above. These unbored portions 27, 38 may be forcibly torn off by a worker's hand. This tearing job enables core rubbers 11a and 11b to be removed, leaving a through-hole. It goes without saying that if the unbored portion is not torn off, the cable-sealing member may be used just as a closure plug having no through-hole. Alternatively, one of the ring-form slit portions illustrated may be used as a through-hole, and another may be used as a closure plug.

The durometer A hardness and composition of the cable-sealing member 40 may be determined as described above.

Such cable-sealing member 40 according to the fourth embodiment is made up of a formed rubber having an extremely low durometer A hardness of 30 or less and includes a plurality of ring-form slit portions 27 and 38 formed in the thickness direction in different places on the first plane 15, so that both the ring-form slit portions may be used as through-holes or, alternatively, one of them may be used as a through-hole and another as a closure plug, resulting in a reduced parts count. In addition, there is good enough sealing capability obtained.

It is to be noted that as far as Applicant's research is concerned, the cable-sealing member 40 made up of a formed rubber having an extremely low hardness and having a plurality of ring-form slit portions dispersedly located in different places on the first plane is not on the market as yet.

[Explanation of the Fifth Embodiment of the Cable-Sealing Member]

Figure 5A:
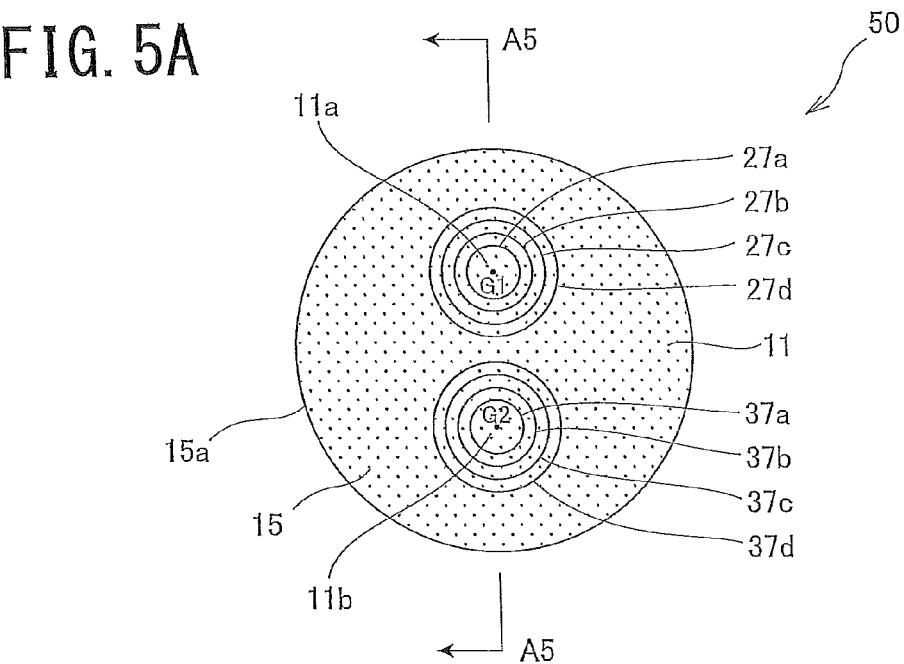
FIG. 5A is a front view of one preferable embodiment of the cable-sealing member according to the present invention.
Figure 5B:
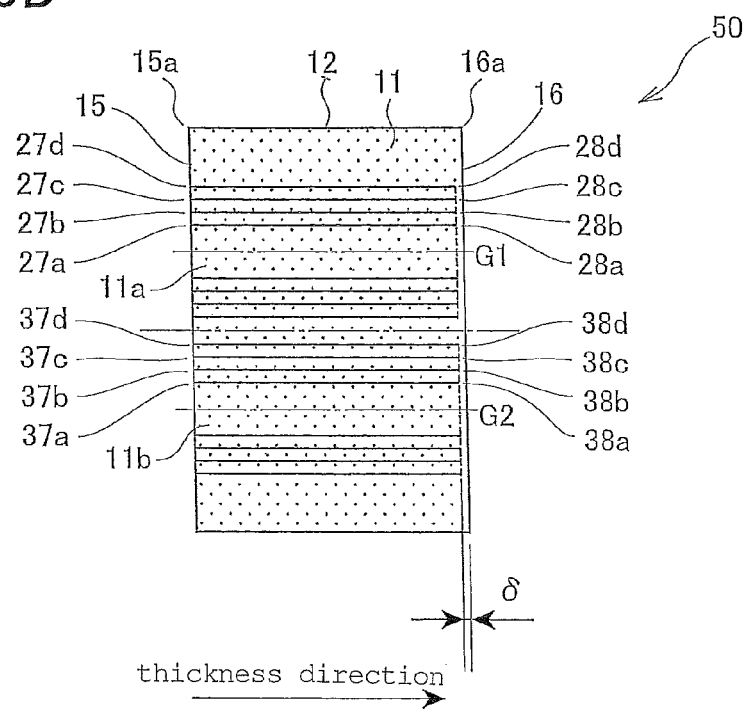
FIG. 5B is a sectional view as taken on A5-A5 of FIG. 5A.

The fifth embodiment of the cable-sealing member according to the present invention is now explained with reference to FIGS. 5A and 5B. FIG. 5A is a front view of one preferable embodiment of the cable-sealing member according to the present invention, and FIG. 5B is a sectional view as taken on A5-A5 of FIG. 5A. Note here that like references used in these drawings substantially mean such like members as already mentioned.

The cable-sealing member 50 according to the fifth embodiment shown in FIGS. 5A and 5B is essentially different from that of the fourth embodiment shown in FIGS. 4A and 4B in that a plurality of ring-form slit portions 27a, 27b, 27c and 27d are concentrically formed with one axis G1 in the thickness direction as a center axis, and a plurality of ring-form slit portions 37a, 37b, 37c and 37d are concentrically formed with another axis G2 in the thickness direction as a center axis.

Four ring-form slit portions are exemplified in each ring-form slit portion set; however, there is no particular limitation on how many ring-form slit portions are provided. By way of example but not by way of limitation, the spacing between the adjacent, concentrically located rings is set at about 0.5 to 2.0 mm, and preferably about 0.7 to 1.2 mm.

Each of the ring-form slit portions 27a, 27b, 27c and 27d with G1 as the center axis starts from the first plane 15, extends in the thickness direction, and terminates just in front of the second plane 16, leaving an ubored site 28a, 28b, 28c, 28d. The distance δ may be set as mentioned above. Each of the ring-form slit portions 37a, 37b, 37c and 37d with G2 as the center axis, on the other hand, starts from the first plane 15, extends in the thickness direction, and terminates just in front of the second plane 16, leaving an unbored portion 38a, 38b, 38c, 38d. The distance δ may be set as mentioned above.

The unbored portions 28a, 28b, 28c, 28d or 38a, 38b, 38d, 38d may be forcibly torn off by a worker's hand, and which of them is to be torn off may be optionally picked up depending on the outer diameter size of the cable used.

This tearing job enables the concentric slit including a core rubber 11a or the concentric slit including a core rubber 11b to be removed, leaving a plurality of spaced through-holes. Through-holes compatible with a plurality of cables having different outer diameters may also be formed. It goes without saying that the cable-sealing member may be used just as a closure plug with the ring-form slit portions all remaining not torn off, leaving through-holes.

The durometer A hardness and composition of the cable-sealing member 50 may be determined as described above.

Because such cable-sealing member 50 according to the fifth embodiment is made up of a formed rubber having an extremely low durometer A hardness of 30 or less, and especially because it includes plural sets of ring-form slit portions dispersedly formed concentrically in the thickness direction, through-holes of size compatible with the outer diameter of the cable used may be optionally picked up and formed by tearing, resulting in a reduced parts count. In addition, good enough sealing capability is obtained. If the cable-sealing member is used just as a closure plug having no through-hole, there is then a further reduced parts count achievable.

It is to be noted that as far as Applicant's research is concerned, the cable-sealing member 50 made up of a formed rubber having an extremely low durometer A hardness of 30 or less and having a plurality of ring-form slit portions formed concentrically in the thickness direction is not on the market as yet.

[Explanation of the Sixth Embodiment of the Cable-Sealing Member]

Figure 6A:
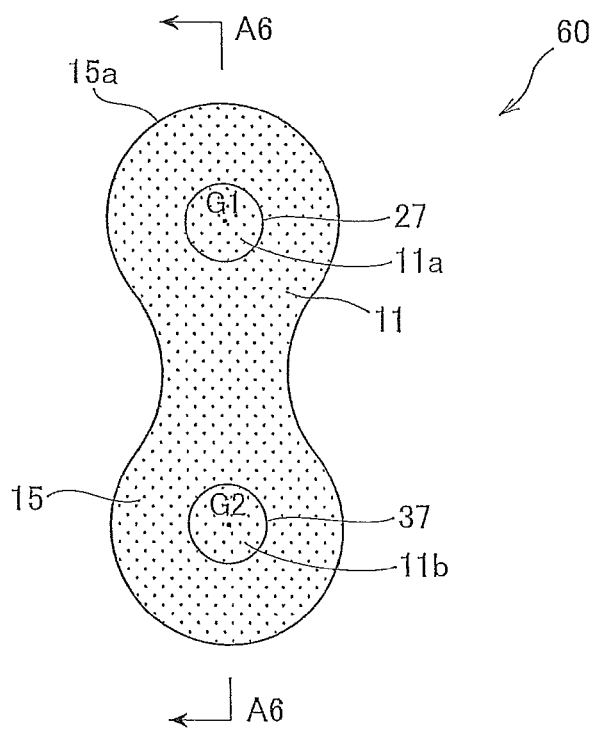
FIG. 6A is a front view of one preferable embodiment of the cable-sealing member according to the present invention.
Figure 6B:
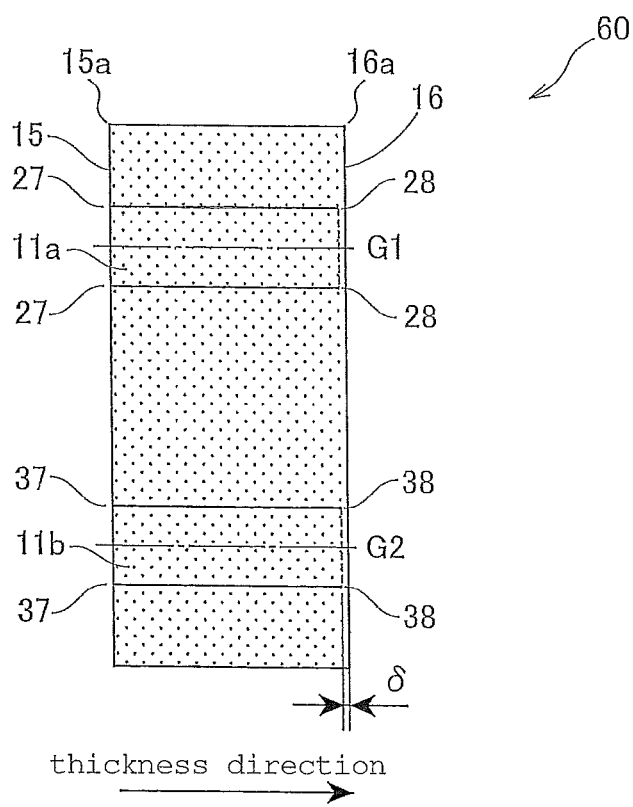
FIG. 6B is a sectional view as taken on A6-A6 of FIG. 6A.

The sixth embodiment of the cable-sealing member according to the present invention is now explained with reference to FIGS. 6A and 6B. FIG. 6A is a front view of one preferable embodiment of the cable-sealing member according to the present invention, and FIG. 6B is a sectional view as taken on A6-A6 of FIG. 6A. Note here that like references used in these drawings substantially mean such like members as already mentioned.

The cable-sealing member 60 according to the sixth embodiment shown in FIGS. 6A and 6B is essentially different from that of the fourth embodiment shown in FIGS. 4A and 4B especially in term of the outside shape of a formed rubber 11: the formed rubber 11 according to the sixth embodiment is in a gourd shape as viewed from front. The basic constituent elements of the sixth embodiment are substantially identical with those of the forth embodiment. The sixth embodiment is more economical because of a lower proportion of the rubber material used for the cable-sealing member 60.

[Explanation of the Seventh Embodiment of the Cable-Sealing Member]

Figure 7A:
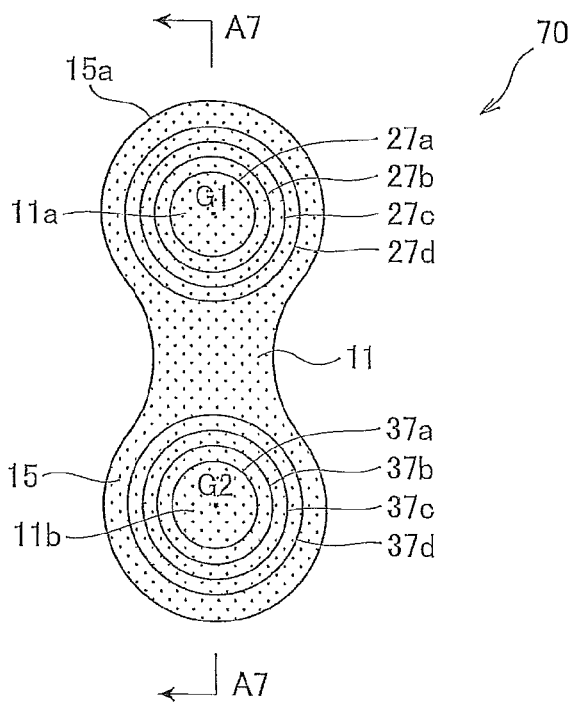
FIG. 7A is a front view of one preferable embodiment of the cable-sealing member according to the present invention.
Figure 7B:
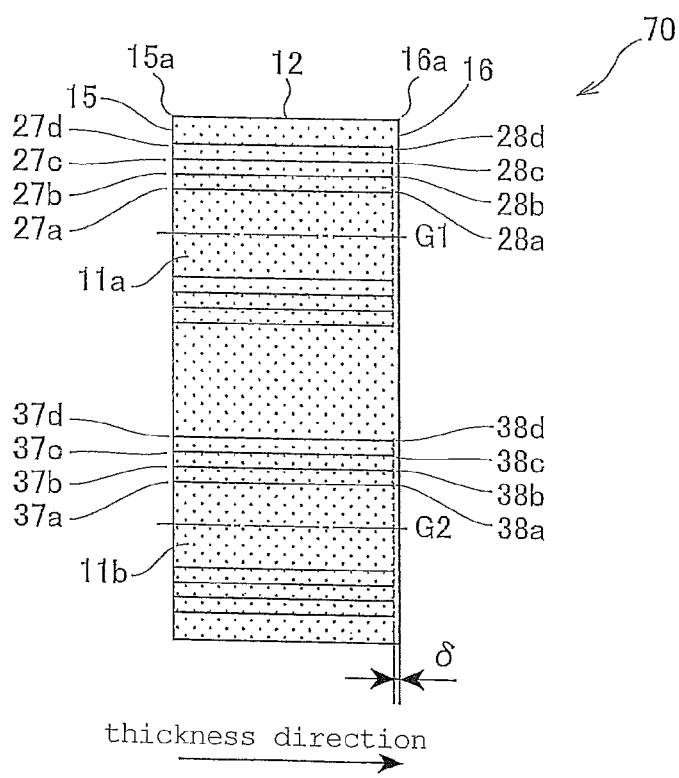
FIG. 7B is a sectional view as taken on A7-A7 of FIG. 7A.

The seventh embodiment of the cable-sealing member according to the present invention is now explained with reference to FIGS. 7A and 7B. FIG. 7A is a front view of one preferable embodiment of the cable-sealing member according to the present invention, and FIG. 7B is a sectional view as taken on A7-A7 of FIG. 7A. Note here that like references used in these drawings substantially mean such like members as already mentioned.

The cable-sealing member 70 according to the seventh embodiment shown in FIGS. 7A and 7B is essentially different from that of the fifth embodiment shown in FIGS. 5A and 5B especially in term of the outside shape of a formed rubber 11: the formed rubber 11 according to the seventh embodiment is in a gourd shape as viewed from front. The basic constituent elements of the seventh embodiment are substantially identical with those of the fifth embodiment. The seventh embodiment is more economical because of a lower proportion of the rubber material used for the cable-sealing member 70.

It is to be understood that the above embodiments of the cable-sealing member provide preferable exemplifications alone, and the present invention is not limited to them.

[Explanation of how to Produce the Cable-Sealing Member]

The method for producing the cable-sealing member as described above will now be explained.

First of all, there is the formed rubber 11 provided, comprising the first and the second planes 15 and 16 that oppose in the thickness direction and the side plane 12 that bridges the peripheral edge 15a of the first plane 15 and the peripheral edge 16a of the second plane 16, and having a durometer A hardness of 30 or less.

The rubber composition used may be as described above. After the addition to the rubber material of additives such as vulcanizing agents, vulcanizing accelerators and oils, they are kneaded by a kneading machine, and the obtained rubber mixture is molded and vulcanized into a given shape thereby preparing the desired formed rubber. As already described, for instance, a suitable amount of the oil well compatible with rubber may be used for adjustment of the hardness of the formed rubber. Alternatively, the rubber hardness may be adjusted by a choice of rubber material having a lower molecular weight.

Then, while a holder is applied over the side plane 12 of the formed rubber, the formed rubber is rotated with one axis in the thickness direction as a rotary axis. In the meantime, a cutting blade is inserted from the first plane 15 into the formed rubber to form ring-form slit portions, and just in front of the second plane 16, the insertion of the cutting blade is halted to form ring-form slit portions that remain unbored on one sides.

Of vital importance in the present inventive producing method is that the formed rubber is rotated with the holder applied over the side plane 12 of the formed rubber. The formed rubber 11 used here has an extremely low durometer A hardness from greater than 0 to up to 30 to improve sealing capability, and if this formed rubber is processed as such while rotated, then the rubber will deform outwardly under the action of centrifugal force, resulting in inability to form ring-form slit portions. The holder here is used for the purpose of obliterating such inconvenience.

Being in a substantially cylindrical configuration, the formed rubber is broken down into two types: one type having a through-hole formed through the center axis in the thickness direction, and another type having not. Depending on such different types, what form the formed rubber is held in differs. In what follows, preferable examples of the formed rubber having a through-hole (for instance, the formed rubber shown in FIG. 3) and preferable examples of the formed rubber having no through-hole (for instance, the formed rubbers shown in FIGS. 1 and 2) will separately be explained. However, the present invention is not limited to the following preferable examples because what is here needed is only to allow an essential part of the present inventive producing process to work well.

PREFERABLE EXAMPLE 1

Figure 9A:
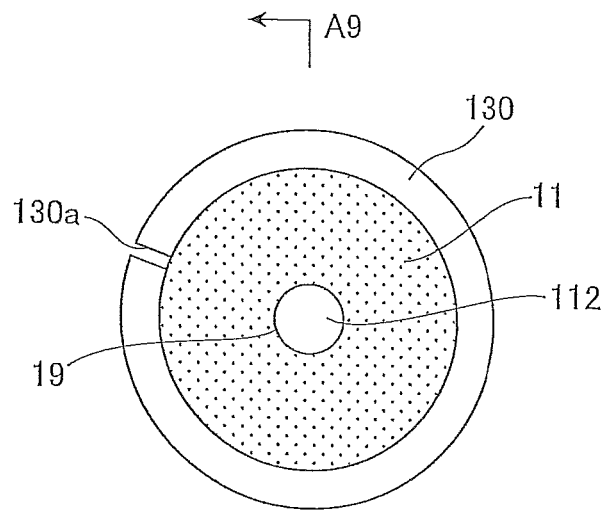
FIG. 9A is a front view of a preferable state where the cable-sealing member of the present invention is held by a holder fixed at one end to a rotary mechanism as it is produced.
Figure 9B:
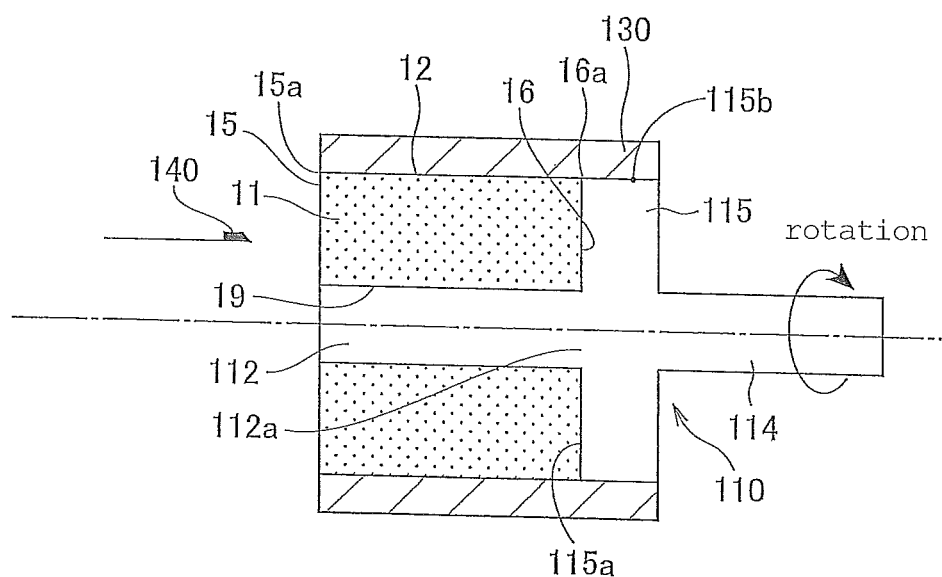
FIG. 9B is a sectional view as taken on A9-A9 of FIG. 9A.

First, a preferable form of holding the formed rubber having a through-hole 19 formed through the center axis in the thickness direction is explained with reference to FIGS. 9A and 9B. FIG. 9A is a front view of a preferable state where the cable-sealing member of the present invention is held by a holder fixed at one end to a rotary mechanism as it is produced, and FIG. 9B is a sectional view as taken on A9-A9 of FIG. 9A.

When the formed rubber 11 has a through-hole 19 formed through the center axis in the thickness direction (for instance, see FIG. 3), a processing holder 110 used in processing of the formed rubber 11 may be set up as shown in FIG. 9.

More specifically, there is the processing holder 110 at the ready that comprises a shaft portion 112 capable to be inserted through the through-hole 19 in the formed rubber 11, a round flange portion 115 positioned at a base 112a of the shaft portion 112 and including a placement plane 115a vertical to the shaft portion 112, and a holder shaft 114 extending from the round flange portion 115 in a direction opposite to the shaft portion 112.

Preferably, the outer diameter of the round flange portion 115 should be much the same as the outer diameter of the formed rubber 11.

The through-hole 19 in the formed rubber 11 is inserted over the shaft portion 112 of the thus set-up processing holder 110, and the formed rubber 11 is set in place while its second plane 16 is in abutment against the placement plane 115a of the round flange portion 115. Thereafter, a cylindrical holder 130 is applied over the side plane 12 of the formed rubber 11 in the state shown in FIGS. 9A and 9B.

In this state, the processing holder 110 is fixedly coupled at the holder shaft 114 to a rotary machine (for instance, rotary chucks of a lathe although not shown), and while the formed rubber 11 is rotated with the shaft portion 112 as a rotary axis, a cutting blade 140 for the formation of the ring-form slit portion is advanced from the first plane 15 into the formed rubber 11 and stopped just in front of the second plane 16 (within the range determined for the distance δ), leaving an unbored portion providing a so-called "ring-form slit portion unbored on one side".

To form a plurality of concentric ring-form slit portions each unbored on one side, the position of inserting the cutting blade 140 from the first plane 15 into the formed rubber 11 may be varied intermittently in order in the radial direction.

The rotary speed of the formed rubber 11 with the shaft portion 112 as a rotary axis may be optionally chosen in consideration of the hardness and various physical properties of the formed rubber 11, the properties of the cutting blade 140, etc.

Preferably but not exclusively, the processing holder 110 is usually formed of a metallic material. The holder may also be formed of resinous, inorganic or other materials. To improve the ability of the holder to hold the formed rubber by adhesion force, it is more preferable that the surface of the shaft portion 112 and the placement plane 115a of the round flange portion 115 against which the formed rubber 11 abuts are each formed as a mirror surface.

The cylindrical holder 130 should preferably be formed of resin, and should preferably be provided on a part of its circumference with a splitting slit 130a (see FIG. 9A) for cutting a closed loop. This is because that holder is improved in terms of handleability and workability. However, the present invention is not limited to such specifications.

Acting to prevent the rubber from deforming outwardly for reason of centrifugal force by rotation, the cylindrical hold 130 should preferably have an inner diameter that is substantially the same as the outer diameter of the formed rubber 11. As shown in FIG. 9B, it is preferable that the outer side surface 115b of the round flange portion 115, too, is covered by the cylindrical holder 130 at the same time.

PREFERABLE EXAMPLE 2

Figure 8A:
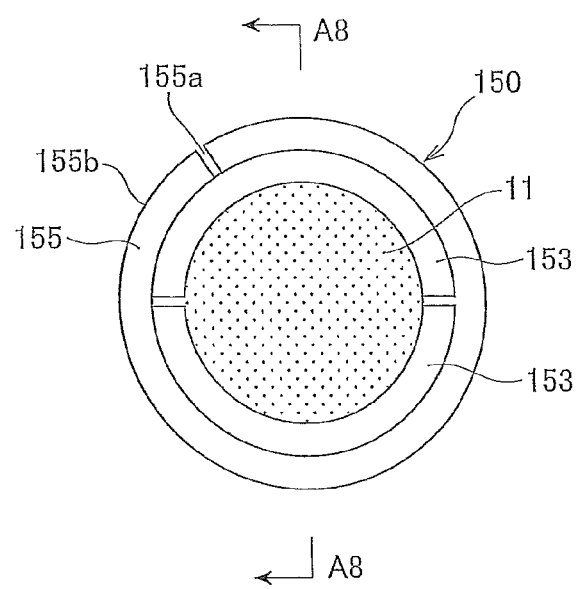
FIG. 8A is a front view of a preferable state where the cable-sealing member of the present invention is held by a holder fixed at one end to a rotary mechanism as it is produced.
Figure 8B:
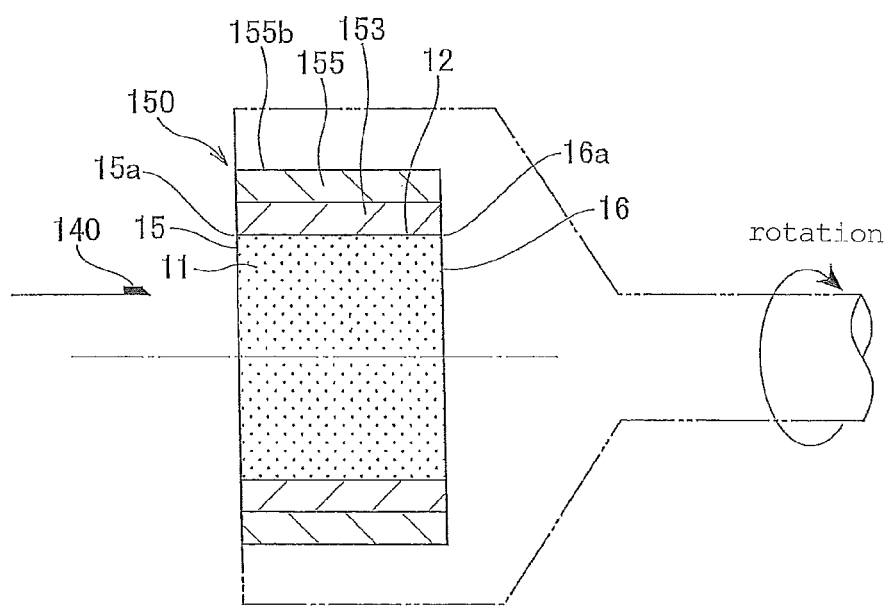
FIG. 8B is a sectional view as taken on A8-A8 of FIG. 8A.

Then, a preferable form of holding the formed rubber having no through-hole through the center axis in the thickness direction is explained with reference to FIGS. 8A and 8B. FIG. 8A is a front view of a preferable state where the cable-sealing member of the present invention is held by a holder fixed at one end to a rotary mechanism as it is produced, and FIG. 8B is a sectional view as taken on A8-A8 of FIG. 8A.

When the formed rubber 11 has no through-hole formed through the center axis in the thickness direction (for instance, see FIGS. 1 and 2), a processing holder 150 used in processing of the formed rubber 11 may be set up as shown in FIG. 8.

Specifically, the holder 150 comprises a cylindrical holder 153 applied over the side plane 12 of the formed rubber 11, and a cylindrical outer holder 155 applied over the holder 153.

In this example, the cylindrical holder 153 comprises a plurality of holder segments (two in the illustrated example) that are assembled into the original cylindrical configuration applied over the side plane 12 of the formed rubber; however, the present invention is not necessarily limited to this structure. For the outer holder 155 it is preferable to use a metallic holder provided on a part of its circumference with a splitting slit 155a for cutting a closed loop. It is preferable that the inner diameter of the cylindrical holder 153 is much the same as the outer diameter of the formed rubber 11, and the inner diameter of the outer holder 155 is much the same as the outer diameter of the cylindrical holder 153.

The thus set-up processing holder 150 is used to assemble the cylindrical holder 153 comprising a plurality of holder segments into the original cylindrical configuration for application, and the outer holder 155 is further applied over this cylindrical holder 153. Then, the outer periphery 155b of the outer holder 155 is fixedly coupled to and between the chucks of a rotary machine (for instance, the chucks of a lathe) in a state shown in FIG. 8B.

In this state, while the formed rubber 11 is rotated by the rotation of the rotary machine, the cutting blade 140 for the formation of the ring-form slit portion is advanced from the first plane 15 into the formed rubber 11 and stopped just in front of the second plane 16 (within the range determined for the distance δ), leaving an unbored portion providing a so-called "ring-form slit portion unbored on one side" (for instance, see FIG. 1).

To form a plurality of concentric ring-form slit portions each unbored on one side, the position of inserting the cutting blade 140 from the first plane 15 into the formed rubber 11 may be varied intermittently in order in the radial direction (for instance, see FIG. 2).

The rotary speed of the formed rubber 11 may be optionally chosen in consideration of the hardness and various physical properties of the formed rubber 11, the properties of the cutting blade 140, etc.

PREFERABLE EXAMPLE 3

The producing method wherein, unlike the above Preferable Examples 1 and 2, one ring-form slit portion is formed with one axis G1 in the thickness direction as the center axis, and another ring-form slit portion is formed with another axis G2 in the thickness direction as the center axis, as shown typically in FIGS. 6 and 7, is explained with reference to FIGS. 10A and 10B.

Figure 10A:
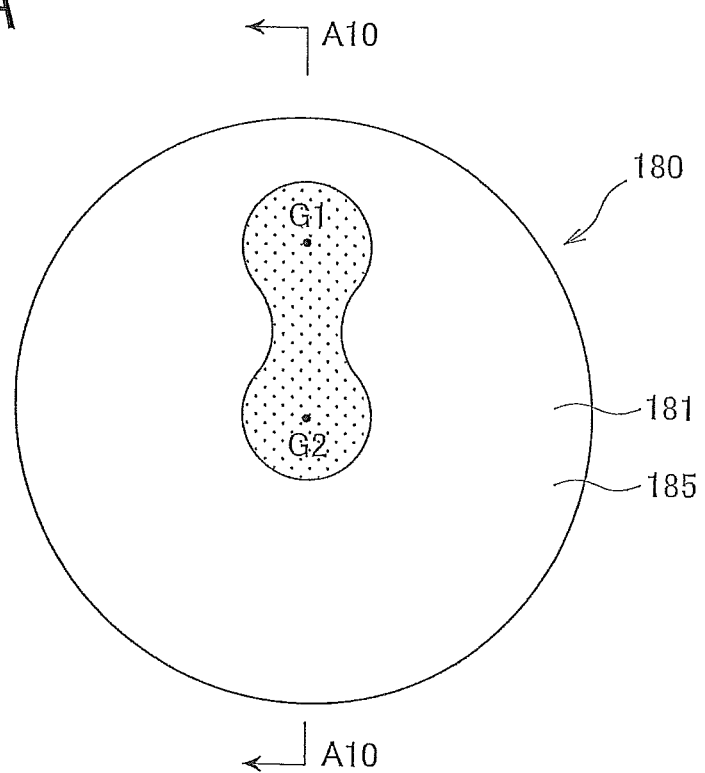
FIG. 10A is a front view of a preferable state where the cable-sealing member of the present invention is held by a holder fixed at one end to a rotary mechanism as it is produced.
Figure 10B:
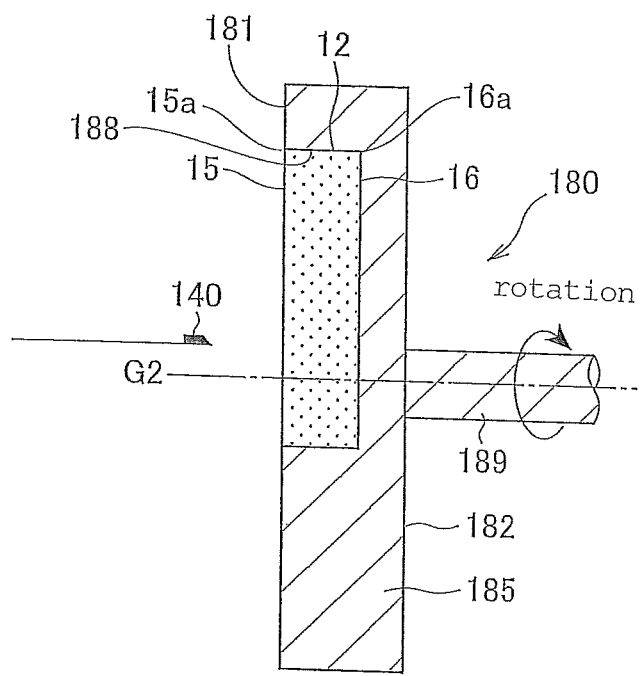
FIG. 10B is a sectional view as taken on A10-A10 of FIG. 10A.

FIG. 10A is a front view of a preferable state where the cable-sealing member of the present invention is held by a holder fixed at one end to a rotary mechanism as it is produced, and FIG. 10B is a sectional view as taken on A10-A10 of FIG. 10A.

FIG. 10 shows one preferable example of a processing holder 180 used in processing of the formed rubber 11 as shown typically in FIGS. 6 and 7. More specifically, the processing holder 180 shown in FIG. 10 comprises a disk-like flange plate 185, a recess 188 formed on one plane 181 side of this flange plate 185 and a holder shaft 189 formed on another plane 182 of the flange plate 185.

As illustrated, the recess 188 formed on one plane 181 side is configured in such a way as to receive the second plane 16 (the second plane 16) and side plane 12 of the formed rubber 11 in a close contact state. In other words, the formed rubber 11 is snugly fitted in the recess 181. Therefore, the side plane 12 of the formed rubber 11 is in a state that is substantially the same as being covered with the holder; even when it is processed while rotated, there is no convenience that the rubber deforms outwardly by centrifugal force.

The center axis of the holder shaft 189 is set in such a way as to be in alignment with another axis G2 in the thickness direction.

The thus set-up processing holder 180 is used to fit the formed rubber 11 in the recess 188 in a state shown in FIGS. 10A and 10B.

In this state, the holder shaft 189 of the processing holder 180 is fixedly coupled to a rotary machine (for instance, the rotary chucks of a lathe although not illustrated), and while the formed rubber 11 is rotated with the shaft portion 189 as the rotary axis (the same as the axis G2), the cutting blade 140 for the formation of the ring-form slit portion is advanced from the first plane 15 into the formed rubber 11 and stopped just in front of the second plane 16 (within the range determined for the distance δ), leaving an unbored portion providing a so-called "ring-form slit portion unbored on one side".

To form a plurality of concentric ring-form slit portions each unbored on one side, the position of inserting the cutting blade 140 from the first plane 15 into the formed rubber 11 may be varied intermittently in order in the radial direction.

Then, once the formed rubber 11 is removed from within the recess 188, it is turned upside down, bringing G1 in the position of G2 so that the center of rotation comes at G1. While the formed rubber 11 is rotated with the shaft portion 189 as the rotary axis (the same as the axis G1), the cutting blade 140 for the formation of the ring-form slit portion is advanced from the first plane 15 into the formed rubber 11 and stopped just in front of the second plane 16 (within the range determined for the distance δ), leaving an unbored portion providing a so-called "ring-form slit portion unbored on one side".

The above operation is substantially the same as the following operation. That is, while the holder is applied over the side plane of the formed rubber and the formed rubber is rotated with one axis in the thickness direction as the rotary axis, the cutting blade is advanced from the first plane into the formed rubber to form a ring-form slit portion and stopped just in front of the second plane to form a ring-form slit portion unbored on one side. Then, while the holder is applied over the side plane of the formed rubber and the formed rubber is rotated with another axis in the thickness direction as the rotary axis, the cutting blade is advanced from the first plane into the formed rubber to form a ring-form slit portion and stopped just in front of the second plane to form a ring-form slit portion unbored on one side. In this manner, at least a plurality of ring-form slit portions are dispersedly located in different places on the first plane.

By turning the formed rubber 11 upside down, the rotary axis may be mutually interchanged between G1 and G2. In the alternative, although not shown, the shaft portion 189 may be designed to be removable to interchange the mounting position between two mutual positions: G1 and G2.

It is to be understood that the method for producing the cable-sealing members 40 and 50 shown in FIGS. 4 and 5, too, may be carried out basically pursuant to the producing process shown in FIG. 10: its detailed explanation will be left out.

As can be seen from what has been described above, the present invention provides a cable-sealing member that is located at an end of a cable protection case for the purpose of preventing liquids from entering into the cable protection case from outside, said cable-sealing member being made up of a formed rubber having a durometer A hardness of greater than 0 up to 30, wherein said formed rubber includes a first plane and a second plane that oppose in the thickness direction and a side plane that bridges a peripheral edge of the first plane and a peripheral edge of the second plane, said formed rubber includes at least one ring-form slit portion formed in the thickness direction, and said ring-form slit portion starts from said first plane, extends in the thickness direction, and terminates just in front of the second plane, leaving an unbored portion. Therefore, the cable-sealing member has good enough sealing capability and includes a removable ring-form slit portion(s), resulting in a reduced parts count. There is also no need of always carrying around a variety of parts, contributing more to improvements in workability.

The present invention also provides a method for producing such a cable-sealing member by forming a rubber including a first plane and a second plane that oppose in the thickness direction and a side plane that bridges a peripheral edge of the first plane and a peripheral edge of the second plane and having a durometer A hardness of greater than 0 up to 30, and rotating the formed rubber with one axis in the thickness direction as a rotary axis while a holder is applied over the side plane of the formed rubber and, in the meantime, inserting a cutting blade from the first plane into the formed rubber to form a ring-form slit portion and stopping the cutting blade just in front of the second plane, leaving a slit-form ring unbored on one side.

Therefore, ring-form slit portions that have not been able to be stably processed of rubbers having low durometer A hardness of less than 30 can be stably processed, advantageously providing a novel cable-sealing member that is excellent in sealing capability and includes a removable ring-form slit portion(s).

APPLICABILITY TO THE INDUSTRY

The present invention is of applicability to the industry: it may have applications in general communications technologies using cables.

EXPLANATION OF THE REFERENCES 10, 20, 30, 40, 50, 60, 70—Cable-sealing members
12—Side plane
15—First plane
16—Second plane
17, 27, 37—Ring-form slit portion
130, 153, 155—Holder
140—Cutting blade

The invention claimed is:

1. A method for producing a cable-sealing member comprising:
   forming a formed rubber including a first plane and a second plane that oppose in a thickness direction and a side plane that bridges a peripheral edge of the first plane and a peripheral edge of the second plane and having a durometer A hardness of greater than 0 up to 30, and
   rotating the formed rubber with one axis in the thickness direction as a rotary axis while a holder is applied over the side plane of the formed rubber and, meanwhile, inserting a cutting blade from the first plane into the formed rubber to form a ring-form slit portion and stopping the cutting blade just in front of the second plane, leaving a slit-form ring unbored on one side.

2. The method for producing the cable-sealing member as set forth in claim 1, wherein:
   said formed rubber is in a substantially cylindrical configuration, and has a through-hole formed through a center axis in a thickness direction thereof,
   there is a processing holder provided, comprising a shaft portion capable of being inserted into said through-hole, a round flange portion positioned at a base of the shaft portion and including a placement plane vertical to the shaft portion, and a holder shaft that extends from said round flange portion in a direction opposite to the shaft portion, and
   the through-hole in the formed rubber is inserted over the shaft portion of said processing holder, the second plane of the formed rubber is set in place while it is in abutment against the placement plane of the round flange portion, the holder shaft of said processing holder is fixedly coupled to a rotary machine while a cylindrical holder is applied over the side plane of the formed rubber, and the formed rubber is rotated with the shaft portion as a rotary axis, leaving a ring-form slit portion unbored on one side.

3. The method for producing the cable-sealing member as set forth in claim 1, wherein there are a plurality of said ring-form slit portions formed concentrically, said plurality of said ring-form slit portions being concentrically formed by varying a position of inserting the cutting blade from said first plane into the formed rubber in order in a radial direction.

4. The method for producing the cable-sealing member as set forth in claim 1, wherein said cylindrical holder is formed of a resin, and provided at a part of a circumference with a splitting slit for cutting a closed loop.

5. The method for producing the cable-sealing member as set forth in claim 1, wherein:

said formed rubber is a substantially columnar configuration having no through-hole through a center axis in a thickness direction thereof, and the cylindrical holder is applied over the side plane of the formed rubber, an outer holder is further applied over said cylindrical holder, an outer periphery of said outer holder is fixedly coupled to and between chucks of a rotary machine, and the formed rubber is rotated to form a ring-form slit portion unbored on one side.

6. The method for producing the cable-sealing member as set forth in claim 5, wherein said cylindrical holder is divided into a plurality of segments, said plurality of segments are assembled into the original cylindrical configuration for application over the side plane of the formed rubber, and said outer holder is made up of a metallic holder that is provided at a part of a circumference with a splitting slit for cutting a closed loop.

7. The method for producing the cable-sealing member as set forth in claim 6, wherein there are a plurality of said ring-form slit portions formed concentrically, said plurality of said ring-form slit portions being concentrically formed by varying a position of inserting a cutting blade from said first plane into the formed rubber in order in a radial direction.

8. The method for producing the cable-sealing member as set forth in claim 6, wherein said cylindrical holder divided into a plurality of segments is formed of a resin.

9. The method for producing the cable-sealing member as set forth in claim 1, wherein:

while the holder is applied over the side plane of the formed rubber, the formed rubber is rotated with one axis in the thickness direction as a rotary axis and, meanwhile, the cutting blade is inserted from the first plane into the formed rubber to form a ring-form slit portion and stopped just in front of the second plane, leaving a ring-form slit portion unbored on one side, and then, while the holder is applied over the side plane of the formed rubber, the formed rubber is rotated with another axis in the thickness direction as a rotary axis and, meanwhile, the cutting blade is inserted from the first plane into the formed rubber to form a ring-form slit portion and stopped just in front of the second plane, leaving a ring-form slit portion unbored on one side, so that a plurality of ring-form slit portions are dispersedly located in different places on the first plane.

10. The method for producing the cable-sealing member as set forth in claim 9, wherein:

there are a plurality of said ring-form slit portions formed concentrically with one axis in the thickness direction as a rotary axis, and there are a plurality of said ring-form slit portions formed concentrically with another axis in the thickness direction as a rotary axis.

* * * * *